A. C. GILBERT.
ELECTRIC MOTOR.
APPLICATION FILED NOV. 26, 1917.
1,381,985.
Patented June 21, 1921.
2 SHEETS—SHEET 1.
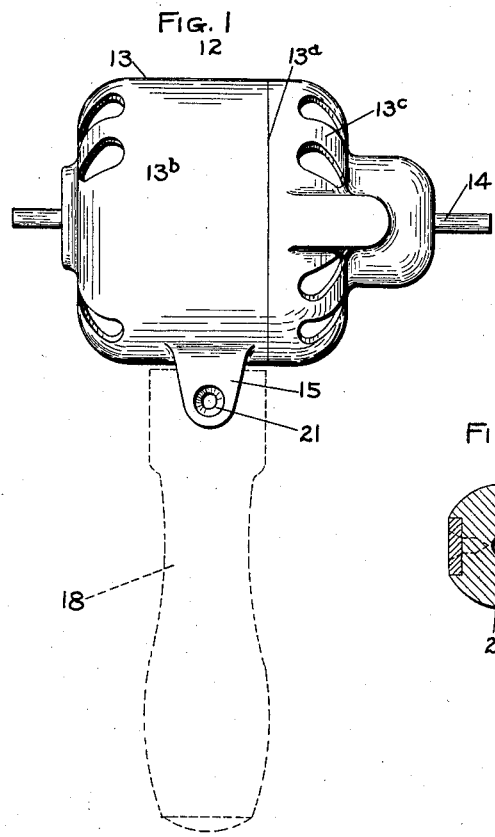
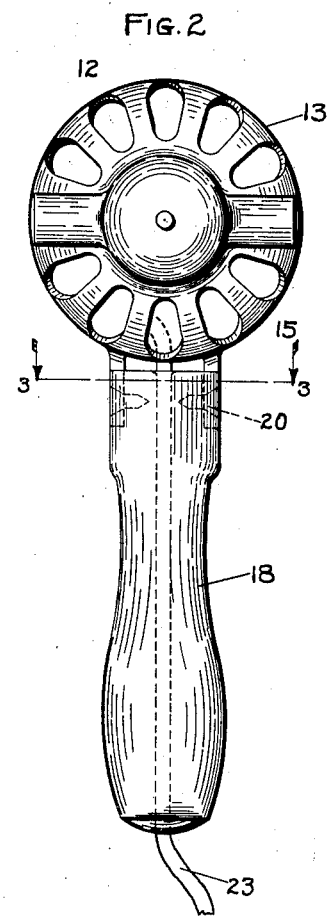
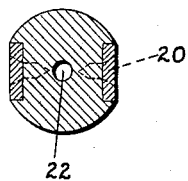
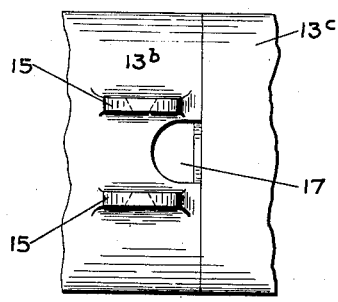
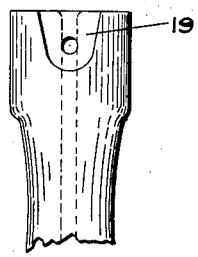
INVENTOR
Alfred C. Gilbert
BY
ATTORNEY A. C. GILBERT.
ELECTRIC MOTOR.
APPLICATION FILED NOV. 26, 1917.
1,381,985.
Patented June 21, 1921.
2 SHEETS—SHEET 2.
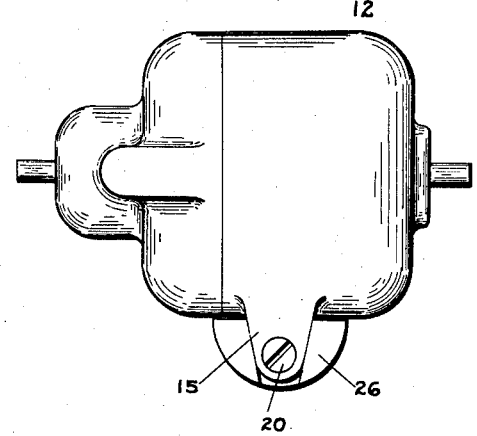
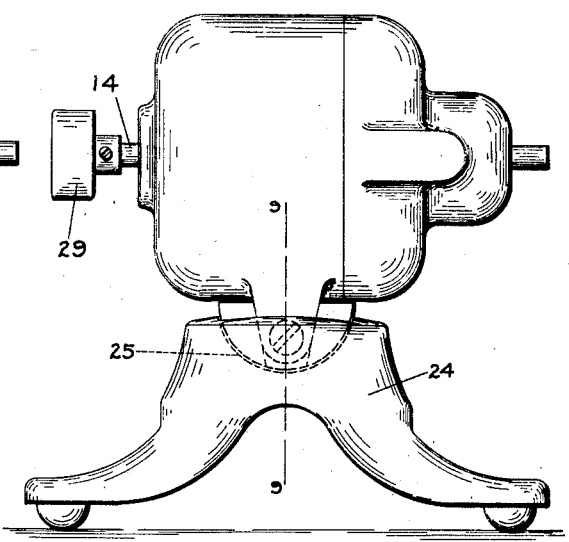
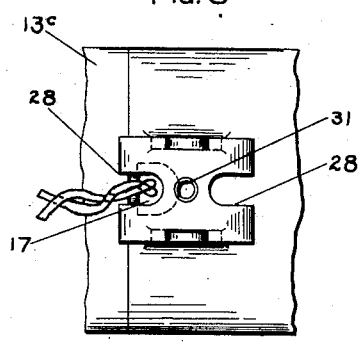
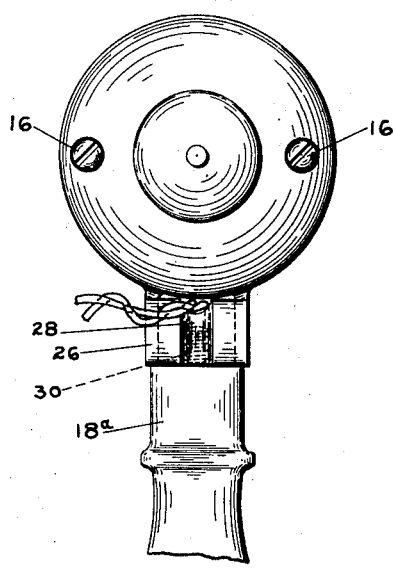
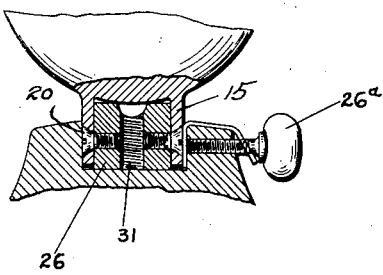
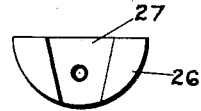
INVENTOR
Alfred C. Gilbert
BY
ATTORNEY

UNITED STATES PATENT OFFICE.

ALFRED C. GILBERT, OF NEW HAVEN, CONNECTICUT, ASSIGNOR TO THE A. C. GILBERT COMPANY, OF NEW HAVEN, CONNECTICUT, A CORPORATION OF CONNECTICUT.

ELECTRIC MOTOR.

1,381,985.  Specification of Letters Patent.  Patented June 21, 1921.

Application filed November 26, 1917. Serial No. 203,975.

*To all whom it may concern:*

Be it known that I, ALFRED C. GILBERT, a citizen of the United States, residing in the city and county of New Haven and State of Connecticut, have invented certain new and useful Improvements in Electric Motors, of which the following is a full, clear, and exact description.

This invention relates to electric motors, and more particularly to small, portable electric motors for home use.

One of the primary objects of my invention is the production of an electric motor construction in which the motor member or motor proper comprising the motor casing, field, armature and motor shaft is adapted to a larger variety of uses such as driving a fan, operating a sewing machine, mixing or agitating liquids, etc. When employed for some of these purposes, for example as a sewing machine motor, the motor member is mounted on a base member that rests upon the table of the sewing machine, whereas, when the motor is used as a drink mixer or as a vibratory massage implement, the motor member is removed from the aforesaid base and equipped with a laterally extending handle member by means of which it may be very readily manipulated.

More specifically, my object is to provide an electric motor construction in which the motor member or motor proper, as distinguished from the device for supporting or manipulating it, is so constructed and arranged that the conversion of the device from one function to another can be very readily effected.

Another object of the invention is to provide an electric motor casing with means whereby it may be very readily secured either to a supporting base or to an operating handle.

Another object of the invention is to provide a motor in which the casing is furnished with an improved form of lug for supporting it pivotally on a suitable base.

Another object of the invention is to furnish an electric motor in which any of two or more different manipulating handles may be easily applied to the motor member.

To these and other ends, the invention consists in the novel features and combinations of parts to be hereinafter described and claimed.

In the accompanying drawings:

Figure 1 is a side elevation of an electric motor embodying my improvements, showing it equipped with a manipulating handle, said handle being shown in dotted lines;

Fig. 2 is an end elevation of the device shown in Fig. 1, the handle being shown in full lines;

Fig. 3 is a section on line 3—3 of Fig. 2;

Fig. 4 is a fragmentary bottom view of the device shown in Fig. 1, illustrating the lugs between which the handle is secured;

Fig. 5 is a fragmentary side view of the upper portion of the handle;

Fig. 6 is a side elevation of the motor member with a lug or block secured between the casing lugs;

Fig. 7 is a side elevation of the motor as arranged for driving a sewing machine or the like, the block between the casing lugs serving to support the motor member pivotally on a base member;

Fig. 8 is a bottom view of the parts shown in Fig. 6;

Fig. 9 is a section on line 9—9 of Fig. 7;

Fig. 10 is an end view of the motor member, showing a further arrangement of parts wherein a handle is secured to the motor member by means of the block between the casing lugs; and Fig. 11 is a detail side elevation of the block.

The motor member 12, which may be of any approved type, comprises a casing 13 generally cylindrical in shape, and a motor shaft 14 extending through the casing. It will be understood, of course, that this motor shaft is fixed to the usual armature (not shown) and that the armature revolves between suitable field windings (not shown) constructed and arranged in the case in the usual or any preferred manner. In the particular example illustrated, the casing 13 is divided transversely along a line 13$^a$, so as to form separate sections 13$^b$, 13$^c$. The brushes (not shown) may be carried by the section 13$^c$. Preferably the motor shaft, which is journaled in the bearings in the respective sections 13^b, 13^c, extends out at each end to an appreciable distance beyond the outer face of the corresponding section, so that a pulley or other device may be attached to either end of the shaft. At one part of its periphery, the casing 13 is provided with a pair of lugs 15. These preferably are formed integrally with the casing, and in the present instance they are formed on the section 13^b, which is the larger of the two casing sections, said lugs being located at substantially the center of the motor casing but at the lower part thereof, as shown in Fig. 1. The two casing sections are secured together by means of screws 16. An opening 17 is formed in the section 13^b at its inner edge between the lugs 15, as shown in Fig. 4, and this opening serves for the passage of the usual electric conductors which extend therethrough into the case, where connection is made with the motor parts. The lugs serve to secure in place a supporting member such as a handle 18, by means of which the motor member may be operated or manipulated when it is used, for example, to drive a massage applicator or other tool. The handle 18 is of substantially cylindrical shape at its upper part and fits snugly between the lugs 15, the upper part of the handle being cut away at opposite sides to form lug-receiving sockets 19, as shown in Fig. 5, in which the inner faces and the edges of the lugs are snugly received. The assemblage is then completed by suitable fastening screws 20 which extend laterally through perforations 21 in the respective lugs into the wood or other material of which the handle is composed. The handle has a longitudinal bore or passage 22 extending completely therethrough, which serves to inclose the conductor wires which pass to the motor through the handle, as shown in Fig. 2. In this particular instance a cable 23 containing the conductor wires passes through the bore 22 in the handle, and through the opening 17 in the lower part of the motor casing. It will be understood, of course, that with this arrangement of parts the handle 18 may be readily applied to and removed from the motor case.

The lugs 15 also serve in mounting the motor member 12 on a suitable base such as the base member 24 shown in Fig. 7. This base member has a socket 25 at the upper portion thereof with a curved bottom and the motor member has a correspondingly shaped projection or lug entering said socket. The socket and lug are so shaped as to permit tilting movement of the motor member relatively to the base member in the plane of the motor shaft 14. When the parts have been properly adjusted, the motor member may be clamped to the base by a clamping screw 26^a, substantially as described in my companion application, Serial No. 203,974, filed November 26, 1917. In accordance with the present invention, the lug on the motor member which engages the socket of the base consists partly of the casing lugs 15 integral with the casing member and partly of an interposed lug or supporting block 26, which is secured between lugs 15 by screws 20 similar to those previously described. The block or supporting member 26 is cut away at the sides to form lug-receiving grooves 27, in which the lugs fit in such a manner that the outer faces of said lugs 15 are substantially flush with the outer side faces of the block. It is understood, of course, that the screws 20 enter tapped holes in the respective sides of the block. The block is curved at the bottom in order to provide for tilting movement of the motor member in the curved socket 25 of the base. The block is furthermore provided at the respective ends with upright grooves 28, either one of which is adapted to be alined with the conductor opening 17 of the motor casing. The block 26 is reversible end for end between the lugs 15, and a groove of the block will register with the conductor opening of the casing regardless of which end of the block is disposed toward the casing section 13^c. This makes for a very quick and convenient assemblage, and it will be understood that after the handle 18 is removed from between the lugs the block 26 may be readily substituted therefor, so that the motor can be used with the base 24, as shown in Fig. 7. In the latter view, the motor shaft is shown equipped with a detachable drive pulley 29.

In some cases, it is desirable to use, in connection with the motor member, a handle through which the conductor wires do not extend, said wires being led to the case in a lateral direction outside of the handle. Such an arrangement is shown in Fig. 10, where the block 26 is shown in place between lugs 15, and a handle 18^a is used, which handle is preferably secured to the block by a screw 30 rigidly fastened to the upper end of this handle 18^a and screwed into a threaded socket 31 in the lower central part of the block. The handle 18^a may be different in several particulars from the handle 18 previously described, in addition to the fact that the conductor wires do not pass through it. It will be readily understood from Fig. 10 that when the handle is screwed to the block, the conductors can pass laterally to the motor outside of the handle in the upper part of the groove 28 which communicates with the conductor opening 17. By taking off the handle 18^a, the motor member may again be used in connection with the base 24, and by removing the block 26, said motor member may again be used in connection with the handle 18.

It will be understood that by my invention the motor member is adapted to a wide variety of uses, and that in making the various assemblages, the parts can be put together and taken apart with maximum facility and convenience.

Various modifications of the construction may be made without departing from the scope of the invention as defined in the claims.

I do not claim broadly herein the combination in an electric motor of a motor member having a lug, a base member having a socket in which said lug rests by gravity, said lug and socket being so formed and located as to permit a tilting movement of the motor member in a vertical plane, and means for clamping the lug frictionally in said socket to hold the motor member in the adjusted position, as claimed in my application, Serial No. 203,974, filed November 26, 1917, hereinbefore identified, nor do I claim in this application an electric motor having a casing with lugs depending therefrom, the base for said motor having a concave socket therein, and means for detachably connecting the motor to the base comprising a block adapted to be interposed between the lugs and to seat in said socket, as claimed in my divisional application, Serial No. 281,329, filed March 8, 1919.

What I claim is:

1. In an electric motor, a motor member having a case with substantially parallel integral lugs, a supporting member interposed between said lugs and having cut away portions at the sides in which said lugs are received, the sides of said supporting member being substantially flush with the lugs, and means for holding said supporting member in place between said lugs, the side edges of said cut away portions engaging the edges of the lugs to hold said motor member and its support against relative movement.

2. In an electric motor, a motor member having a case with substantially parallel integral lugs, a supporting member interposed between said lugs and having cut away portions at the sides in which said lugs are received, the sides of said supporting member being substantially flush with the lugs, and means for holding said supporting member in place between said lugs comprising screws passing laterally through the lugs and engaging threaded openings in said supporting member, the side edges of said cut-away portions forming shoulders which engage said lugs to prevent rotative movement of said motor member about said screws.

3. In an electric motor, a motor casing of substantially cylindrical shape having at one part thereof a pair of outwardly extending substantially parallel integral lugs, a supporting member interposed between said lugs, and means for detachably securing the supporting member to said lugs, said supporting member having sockets at the respective sides thereof in which the lugs are received, and said sockets being provided with shoulders fitting closely against the side edges of the lugs to prevent relative movement of the motor casing and supporting member.

4. In an electric motor, a casing divided transversely into sections, a pair of lugs integral with one of said sections, said lugs located substantially at the central part of the motor casing, and a supporting member interposed between said lugs and detachably secured to the same, the casing section having the lugs being provided with a conductor opening extending to the adjacent edge of the other casing section.

In witness whereof, I have hereunto set my hand this 23d day of November, 1917.

ALFRED C. GILBERT.